United States Patent [19]
Parkhill et al.

[11] Patent Number: 5,073,076
[45] Date of Patent: Dec. 17, 1991

[54] COMBINED LAMINATING AND BINDING MACHINE

[75] Inventors: Alan J. Parkhill; Roy P. Cook, both of Temecula, Calif.

[73] Assignee: Banner American Products, Inc., Temecula, Calif.

[21] Appl. No.: 620,733

[22] Filed: Dec. 3, 1990

[51] Int. Cl.$^5$ .............................................. B42B 5/00
[52] U.S. Cl. ......................................... 412/33; 412/9; 412/900; 412/902; 156/536; 156/555; 156/908
[58] Field of Search .................... 412/33, 9, 900, 902; 156/477.1, 536, 555, 583.1, 908

[56] References Cited

U.S. PATENT DOCUMENTS

| | | | |
|---|---|---|---|
| 3,518,143 | 6/1970 | Führ | 412/900 |
| 3,804,694 | 4/1974 | Blair | 156/477.1 |
| 4,367,116 | 1/1983 | Wiholm | 156/366 |
| 4,420,359 | 12/1983 | Goldsworthy | 156/379.8 |
| 4,471,976 | 9/1984 | Giulie | 281/35 |
| 4,525,116 | 6/1985 | Holmberg | 412/8 |
| 4,678,528 | 7/1987 | Smith et al. | 156/220 |
| 4,743,332 | 5/1988 | Black | 156/359 |
| 4,743,334 | 5/1988 | Singer | 156/555 |
| 4,818,168 | 4/1989 | Battisti | 412/37 |
| 4,877,478 | 10/1989 | Cappi | 156/555 |

Primary Examiner—P. W. Echols
Assistant Examiner—David P. Bryant
Attorney, Agent, or Firm—Harvey S. Hertz; William T. O'Neil

[57] ABSTRACT

A device for simultaneously or sequentially edge binding a sheaf of papers and separately laminating single sheets. A heat applying assembly includes a body of heat conducting material having a generally horizontal elongated slot extending through the body and two pairs of rollers, one at an input end of the slot and the other at an output end thereof for feeding a document between two thermoplastic sheets through the slot. Upper and lower imbedded heating coils apply heat above and below the slot for fusing the thermoplastic sheets to effect lamination of the document. The body of heat conducting material provides an upper surface slanted at an acute angle with respect to the horizontal. A rigid guide surface oriented by an equal angle with respect to the vertical provides for gravity retention of a sheaf of paper to be edge bound against the aforementioned upper surface, a heat setting adhesive being introduced along the common end of tyhe sheaf of papers thereby binding the papers along a spine.

12 Claims, 1 Drawing Sheet

U.S. Patent • Dec. 17, 1991 • 5,073,076
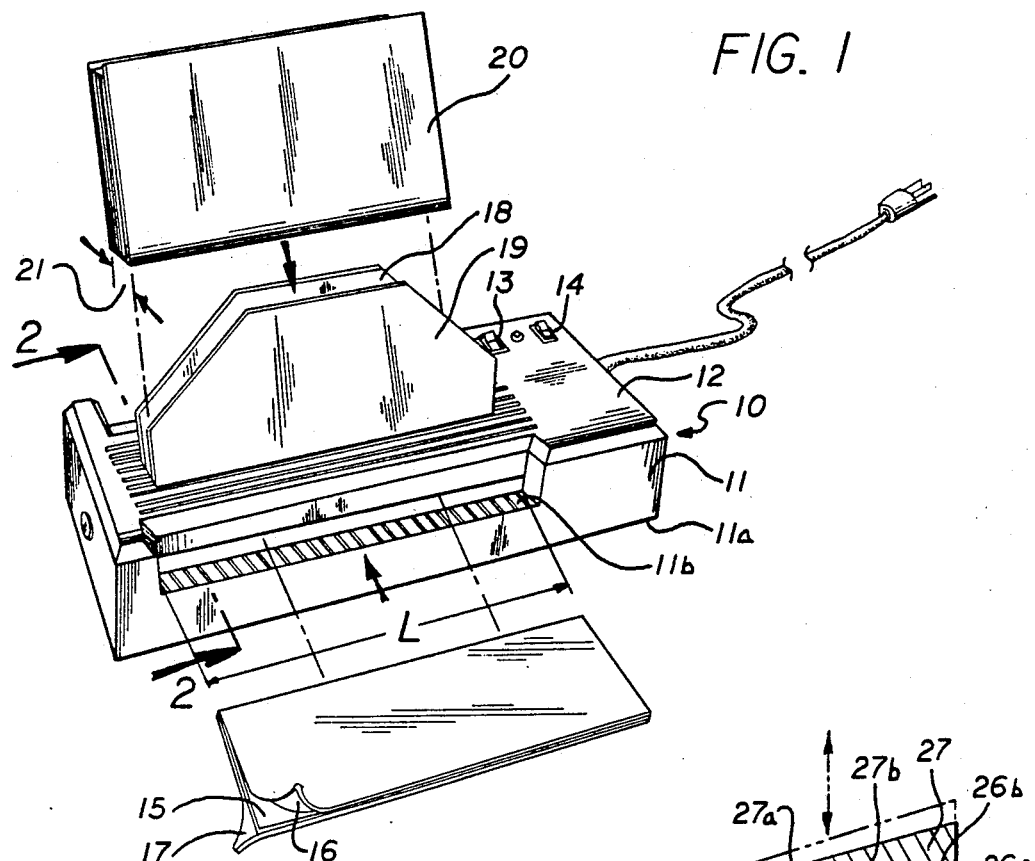
FIG. 1
FIG. 3
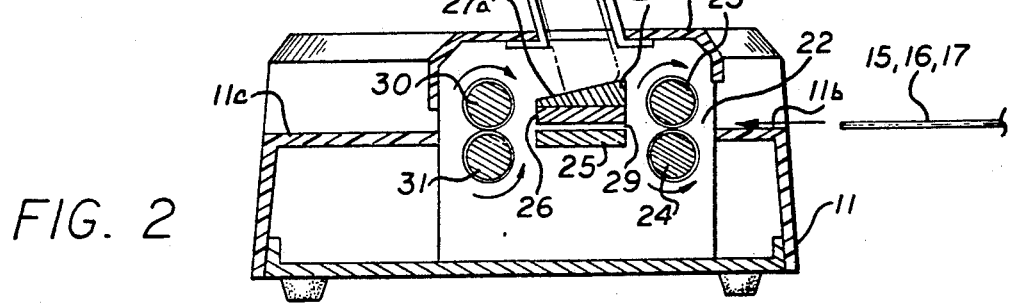
FIG. 4
FIG. 2

COMBINED LAMINATING AND BINDING MACHINE

BACKGROUND OF THE INVENTION

The invention relates to multipage document binding and to single sheet document lamination in a common machine.

In the prior art, both of those technologies are known separately. Thus, separate machines have been required to accomplish both functions sequentially or contemporaneously. The disadvantages of separate machines both physically and economically are obvious. These disadvantages are addressed by the unique structure of the invention as described hereinafter.

Typical of prior art binding machines is that of U.S. Pat. No. 4,367,116. In that disclosure a sheaf of paper to be edge-bound is inserted between guides vertically (on edge). The guide comprises two panels, one movable to hold the sheaf of papers in compression. The hot plate which sets the adhesive material is essentially horizontal in that reference. This device is relatively slow in operation because of the mechanical adjustment required. However, it does define the basic prior art of edge binding of a sheaf of papers.

U.S. Pat. No. 4,818,168 discloses another form for the basic binding device with converging guides which narrow at a lower apex to compress the multi-page document at the spine during the thermal binding operation.

Separate laminating machines are extant in the prior art. Basically these machines rely on heating of a document sandwiched between sheets of a thermoplastic material - polyethelene, for example. Temperatures on the order of 300 degrees F. produce enough softening of the thermoplastic to produce fusion.

The manner in which the invention advances the state of this art will be understood as this description proceeds.

SUMMARY OF THE INVENTION

The invention relates to a novel combination and certain novel features taken alone. A particularly novel aspect of the combination is the gravity loading of the binding portion of the machine. A plurality of sheets (sheaf) to be edge-bound stacks at an angle with respect to the vertical and lies against an angled rigid guide panel. To accomodate this loading arrangement, the top surface of the underlying heat applying (edge-heating) assembly is angled so that its planar surface is normal to the angled guide panel such that the spine of the bindable edge rests against the heated surface as fully as in the prior art case when the sheaf of papers stack vertically on a horizontal hotplate.

For the laminating function, the body of the heating assembly includes an elongated slot through the body from an input to an output. An input pair of rollers grips the document to be laminated which is sandwiched between thermoplastic sheets and advances it through the slot thereby subjecting it to heating which softens the thermoplastic. Imbedded in the body are upper and lower electrical heating coils. The upper heating coils are the main source of heating at the top (angled) surface of the heat-applying assembly for the binding function.

The heating assembly may be one piece above the slot or may be two pieces. If two pieces are employed, the portion containing the upper heating coils may be very similar to the lower piece (below the slot). An additional elongated piece of trapezoidal cross-section is closely mated to the upper heating coil-containing piece for enhancement of heat conduction to the upper (angled) surface of the trapezoidal piece.

The input roller pair effects advancement of the document to be laminated until it disappears within the slot. Subsequently the output roller pair pulls the document through the slot and at the same time affords some forging action against the softened thermoplastic.

The details of a typical embodiment of the invention with certain variations described will be understood from the detailed description hereinafter taken with the drawings.

BRIEF DESCRIPTION OF THE DRAWINGS

FIG. 1 is pictorial showing the general form of a typical machine embodiment according to the invention.

FIG. 2 is a sectional view taken along the lines 2—2 of FIG. 1.

FIG. 3 is a sectional view of the heat applying assembly of FIG. 2.

FIG. 4 is a variation of FIG. 3 in which the upper planar member and the trapezoidal heat sink are combined as a single monolithic piece.

DETAILED DESCRIPTION

Referring now to FIG. 1, the typical unit according to the invention is depicted at 10. A housing 11 includes a bottom panel 11a, and deck sections 11b and 11c and a bonnet 12 (see also FIG. 2). Switches 13 and 14 conventionally control the power to the heating coils and roller drive motor, respectively.

A document 15 sandwiched between thermoplastic sheets 16 and 17 of polyethelene, for example) has a width of 11 inches in a typical case and the width of the gap "L" in the same direction is approximately 12 inches in a typical embodiment.

FIG. 2 affords a view of the internal structure of the apparatus of FIG. 1. The input for a document to be laminated is at 22 where document 15 and thermoplastic sheet 16 and 17 are inserted and are "picked up" between rollers 23 and 24 and moved inward (left in FIG. 2) to the aperture defined by chamfers 25a and 26a on elongated planar members 25 and 26, respectively, and through gap 29. Reference to FIG. 3 is desirable at this point in the description. As the document passes beyond the grip of rollers 23 and 24, its passage within gap (slot) 29 is continued by the grip of rollers 30 and 31 until exited over deck section 11c.

During its time passing through gap 29, the thermoplastic sheets are softened by the heat of members 25 and 26 and rollers 30 and 31 have some "forging" effect on the still soft plastic although cooling occurs quickly thereafter and the laminated document exits over deck section 11c.

Referring to FIG. 3, heating of members 25 and 26 is effected by resistance coils 25b and 26b, so that gap 29 is heated from above and below. A typical temperature for polyethelene plastic lamination is on the order of 300 degrees F. Electrical connections for heating coils 25b and 26b are at 25c, 25d, 26c and 26d and are typical and may be anywhere as long as there is no interference with the operation of the device.

The heat sink 27 is in thermal contact with member 26 along an interface 27b. A variation in the structure of the elongated planar members is depicted in FIG. 4. The elements 26 and 27 of FIG. 3 are combined into a single monolithic element 28 with a corresponding imbedded upper resistance heating coil 28b and comparable electrical connections.

It should be understood that the structures of FIG. 3 and FIG. 4 are elongated in the "L" direction as identified on FIG. 1.

Referring back to FIG. 2, the guide panels 18 and 19 are seen tilted at an acute angle with respect to the vertical. A sheaf of papers to be edge-bound 20 is inserted between panels 18 and 19 so as to lie against panel 18 and abut top surface 27A (or 28A if the FIG. 4 variation is used). Guide panel 19 is spaced from panel 18 to conform to a predetermined maximum thickness of the sheaf of papers to be bound but may in fact be eliminated in the general case since the angle of panel 18 provides the support needed.

As is conventional in this art, a tape with a layer of thermally curable adhesive is inserted against surface 27A (or 28A) and the heat of that surface effects the binding operation.

The electric motor drive for the rollers 23, 24, 30 and 31 is conventional and the related electrical connections are similarly conventional and are, therefore, not specifically described.

Various modifications of the details of the disclosed structure are possible within the spirit of the novel combination and it is not intended that the scope of the invention be limited to the specifics of the drawings or of this specification. The drawings and description are typical and illustrative only.

What is claimed is:

1. A combination pouch laminating and thermal binding machine comprising:
    upper and lower elongated planar members of heat conducting material, said members each having an embedded electric heating coil, said members being generally parallel, horizontal and spaced vertically to provide a uniform gap therebetween;
    feed means including at least one pair of counter-relating rollers for feeding a document sandwiched between two thermoplastic sheets into said gap and therethrough to effect lamination of said document when said embedded heating coils are energized to a temperature high enough to fuse said thermoplastic sheets;
    a heat sink member of heat conductive material and of generally trapezoidal cross-section, said heat sink member having a lower surface in thermal contact with the upper surface of said upper planar member and having an upper surface making a first acute angle with respect to the upper surface of said planar member; and
    guide means for holding a sheaf of papers to be bound along a common edge, said guide means being oriented such that said common edge of said sheaf of papers lies against said heat sink member upper surface.

2. The combination according to claim 1 in which said guide means holds said sheaf of papers to be bound at a second acute angle with resect to the vertical, said first and second acute angles being equal.

3. The combination according to claim 2 in which said planar members and said heat sink member are aluminum.

4. The combination according to claim 1 in which said planar members and said heat sink member are aluminum.

5. The combination according to claim 1 in which said feed means includes a first pair of rollers for feeding said document and thermoplastic sheets into said gap and a second pair of rollers at the exit of said gap for exiting said document from said gap in laminated condition, said second pair of rollers rotating to pull said laminated document through said gap.

6. The combination according to claim 5 in which the aperture of said gap adjacent said first pair of rollers is chamfered adjacent said first pair of rollers to provide ease of guidance for said document and thermoplastic sheets into said gap.

7. The combination according to claim 1 in which said guide means comprises a rigid sheet, said sheaf of papers to be bound resting against said rigid sheet and thereby edge abutting said heat sink upper surface.

8. A combination pouch laminating and thermal binding machine, comprising:
    a heat applying assembly of heat conducting material, including a horizontally elongated slot through said assembly, said heat applying assembly having a top surface planar at an acute angle with respect to the plane of said slot;
    first and second electric coil heating elements imbedded in said assembly above and below said slot respectively to apply heat from above and below said slot;
    feed means for conveying a document sandwiched between two thermoplastic sheets through said slot to effect fusion of said thermoplastic sheets, to thereby laminating said document;
    and guide means independent of said feed means for holding a sheaf of papers to be bound along a common edge to provide a book spine for said sheaf of papers, said guide means including a rigid sheet oriented at a second angle with respect to said heat applying assembly top surface such that the plane of said common edge of said sheaf of papers strikes said heat applying assembly top surface generally parallel thereto whereby a thermally set adhesive material placed along said heat applying assembly top surface may be set to said sheaf of papers to effect binding of said sheaf of papers along said common edge.

9. The combination according to claim 8 in which said first elecric coil heating element is proximate to said heat applying assembly top surface thereby heating said top surface by conduction.

10. The combination according to claim 9 in which said heat applying assembly is fabricated of aluminum.

11. The combination according to claim 8 in which said heat applying assembly is fabricated of highly conductive metal.

12. The combination according to claim 8 in which said feed means comprises first and second pairs of rotating rollers for gripping and feeding said document and said thermoplastic sheets through said slot, said first pair of rollers being adjacent an input end of said slot and said second pair of rollers being adjacent the output end of said slot.

* * * * *